Patented Sept. 4, 1945

2,384,026

UNITED STATES PATENT OFFICE 2,384,026

WOOD PRESERVATIVE

Bror Olof Häger, Stockholm, Sweden, assignor to Bolidens Gruvaktiebolag, Stockholm, Sweden, a joint-stock company limited of Sweden No Drawing. Application May 7, 1943, Serial No. 486,087

6 Claims. (Cl. 167—38.5)

This invention refers to a preservative for wood and other organic materials containing arsenic acid and a ferrous salt or salts.

During recent years the arsenic compounds, particularly certain arsenates, have attracted increasing attention as preservatives. The reason for this attention is that they possess exceedingly good mycocidal and insecticidal properties and at the same time can be obtained at a low cost. The treatment of lumber is mostly effected by impregnating it with these compounds in aqueous solutions and subsequently drying the lumber. The problem is in this case to transfer the arsenic compounds into insoluble form by chemical reactions occurring within the lumber in order to prevent leaching.

On the bases of investigations conducted on aqueous solutions of preservatives containing a ferrous salt or salts and arsenic acid in such proportions that (ferric arsenate being considerably less soluble) the ferrous arsenate is precipitated within the impregnated material by the oxidation of the ferrous ions to ferric ions, it has been found possible to develop a good preservative. An aqueous solution of the preservative shows great durability in solution and good fixation of the arsenic acid in highly insoluble form in the impregnated material. In the said investigations the concentrations in the preservative solutions of arsenic acid, calculated as $As_2O_5$, varied between 0.5 and 2 per cent by weight, which concentrations are in conformity with conditions found in practice. The molecular ratio between the ferrous salt and the arsenic acid was varied between 0.6 and 3.

The durability of preservative solutions containing a ferrous salt and arsenic acid can be considerably improved by increasing the acidity of the solutions. As arsenic acid is not readily dissociated, however, the acidity of the solutions cannot be increased to a sufficient degree merely by increasing the concentration of the arsenic acid. If the ferrous salt is a salt of a relatively strong acid, the acidity may be increased by entirely or partly replacing the neutral ferrous salt by a corresponding acid ferrous salt or, in other words, by a corresponding ferrous salt with an excess of acid. If this be done the oxidation of ferrous ions into ferric ions in the solutions will proceed very slowly, thus obviating the occurrence of precipitates of ferric arsenate in the preservative solutions prior to their use for impregnating wood even if they are kept for a considerable length of time. Though the formation of ferric ions, and thus the fixation of the arsenic acid in the form of ferric arsenate, proceeds somewhat slowly in the impregnated material, this process can be speeded up by use of a catalyser for the oxidation, e. g. by adding a bromide such as potassium bromide to the preservative solution. In fact the requisite durability of the solutions in conjunction with a satisfactory fixation of the arsenic acid in the impregnated material in the form of ferric arsenate cannot be obtained solely by regulating the acidity. The content of potassium bromide in the solutions must, however, be so adjusted that a satisfactory fixation of the arsenic acid is attained without affecting the durability of the solutions. Should the content of potassium bromide in the preservative solutions amount, for example, to 2.5 gr. per litre, a good fixation of the arsenic acid in the impregnated material will certainly be obtained, but the durability would not be satisfactory. If, however, the content of potassium bromide is reduced to 0.1 gr. per litre, the fixation of the arsenic acid in the impregnated material will be practically as good as with a potassium bromide content of 2.5 gr. per litre, whilst the durability of the solutions will be entirely satisfactory and no precipitates will occur even when the solutions are kept for a considerable length of time prior to use.

In case of very exacting requirements regarding the fixation of the arsenic acid in the impregnated material, the molecular ratio between the ferrous salt and the arsenic acid should be raised from 1 to 2, or if need be to 3. This additional content of ferrous salt will not entail any reduction of practical importance in the durability of the solution, provided that the acidity has been increased in the manner above indicated.

Some molecular compositions of preservatives in accordance with the above observations are given below. Aqueous solutions thereof, besides having the requisite durability, will admit of a satisfactory fixation of the arsenic acid in the impregnated material. All solutions should include potassium bromide as a catalyzer in a content of about 0.1 gr. per litre.

In general, the composition of preservative solutions according to a preferred embodiment of the present invention may be represented broadly by the following formula, where the coefficients of $Fe(HSO_4)_2$, $FeSO_4$ and $H_3AsO_4$ represent the molecular ratios between those several components:

$0.5\ Fe(HSO_4)_2 + (0.5\ to\ 2.5)\ FeSO_4 +$
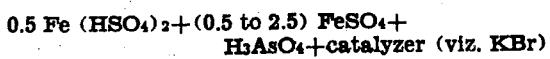

The above indicated content of acid ferrous sulphate, and thus of the acidity of the preservative solutions, may be regarded as a maximum. This content can as a rule be reduced, though this must not be done to such an extent as to lessen the durability.

In the preparation of solutions of preservatives in accordance with the present invention one may proceed also from a neutral ferrous salt, arsenic acid and a strong acid, or else a ferrous salt and arsenic acid containing a strong acid, e. g. sulfuric acid.

The limits for particularly suitable compositions of preservatives in conformity with the present invention are indicated below:

| | Parts |
|---|---|
| $FeSO_4.7H_2O$ | 7 –145 |
| $H_3AsO_4.\frac{1}{2}H_2O$ | 6 – 26 |
| $H_2SO_4$ | 0.4– 4 |
| KBr | 0.1 |

The proportions must not be varied arbitrarily within the stated limits: the preservative should contain 1.1–5.5 parts of ferrous sulphate, $$FeSO_4.7H_2O$$

per 1 part of arsenic acid, $H_3AsO_4.\frac{1}{2}H_2O$, and the content of free sulphuric acid should be such as to ensure a satisfactory durability of the solutions.

The durability of the said preservative solutions which is obtained by the increase of the acidity in the manner above described is indicated by the following example: In an aqueous solution of ferrous sulphate, $FeSO_4$, and arsenic acid, $H_3AsO_4$, with these substances in the molecular ratio 1:1 and a concentration of 1 per cent, calculated as $As_2O_5$, of the solution by weight, after keeping the solution for 10 days with free access of air, 12 per cent of the original content of arsenic acid will be obtained in the form of precipitates. In solutions of a preservative compounded according to the present invention as shown above, on the other hand, no precipitate will form under corresponding conditions.

An idea of the fixation of the arsenic acid in the material impregnated with solutions of preservatives in accordance with the present invention, is obtained from the results of the following investigations. Air-dried sawdust was impregnated with preservative and was thereafter for 3 days stored without drying possibilities. The sawdust was subsequently air-dried at room temperature for 4 days, whereupon the original moisture content was restored. The impregnated sawdust was then leached three times with distilled water, whereafter the amount of arsenic acid remaining in the sawdust was determined by analysis. In the table below the results of some such leaching tests are given, in which the remaining arsenic acid has been calculated in per cent of the amount of arsenic acid which was added to the sawdust by impregnation. The concentration of the preservative in the solutions used was 1 per cent, calculated as $As_2O_5$.

| The composition of the preservative | Remaining arsenic acid after leaching |
|---|---|
| | Percent |
| $FeSO_4+H_3AsO_4$ | 41 |
| $2FeSO_4+H_3AsO_4+0.5\ H_2SO_4$ | 26 |
| $2FeSO_4+H_3AsO_4+0.5\ H_2SO_4+KBr$ (0.1 gram per liter) | 66 |

Investigations have shown that the corrosive effects of solutions of preservatives in accordance with the present invention are about the same as those of solutions of zinc chloride ($ZnCl_2$), which in practice are often used as preservatives.

This application is a continuation in part of my copending U. S. application, Serial No. 303,137, filed November 6, 1939, and constitutes a further improvement thereover.

Having thus described my invention I declare that what I claim is:

1. A preservative for wood and other organic materials comprising (a) a substance selected from the group consisting of (1) an acid ferrous salt and (2) a mixture of an acid and a neutral ferrous salt, (b) arsenic acid, and (c) potassium bromide as a catalyzer for the oxidation, in the impregnated material, of the ferrous salt to ferric salt.

2. A preservative in accordance with claim 1 wherein under (a) the acid is sulfuric and the ferrous salt is a sulfate.

3. An aqueous solution of a preservative as claimed in claim 1 containing as the catalyzer the equivalent of less than 2.5 gr. of potassium bromide per litre of the solution.

4. An aqueous solution as claimed in claim 1 containing as the catalyzer the equivalent of about 0.1 gr. of potassium bromide per litre of the solution.

5. A preservative in accordance with claim 1 containing 0.6–3 molecules of ferrous salt per molecule of arsenic acid.

6. A preservative in accordance with claim 1 having the following composition:

| | Parts |
|---|---|
| $FeSO_4.7H_2O$ | 7 –145 |
| $H_3AsO_4.\frac{1}{2}H_2O$ | 6 – 26 |
| $H_2SO_4$ (100 per cent) | 0.4 – 4 |
| KBr | 0.1 |

BROR OLOF HÄGER.

CERTIFICATE OF CORRECTION.

Patent No. 2,384,026.　　　　　　　　　　　　　　　September 4, 1945.

BROR OLOF HÄGER.

It is hereby certified that error appears in the printed specification of the above numbered patent requiring correction as follows: Page 1, second column, line 50, for "those" read --these--; page 2, first column, line 24, strike out the chemical designation "$A_3AsO_4 \cdot \frac{1}{2}H_2O$" and insert instead --$H_3AsO_4 \cdot \frac{1}{2}H_2O$--; and that the said Letters Patent should be read with this correction therein that the same may conform to the record of the case in the Patent Office.

Signed and sealed this 25th day of December, A. D. 1945.

Leslie Frazer

First Assistant Commissioner of Patents.

(Seal)